April 14, 1953 L. A. SADER ET AL 2,634,538
NIBBLE INDICATOR FOR USE ON FISHLINES
Filed May 22, 1951
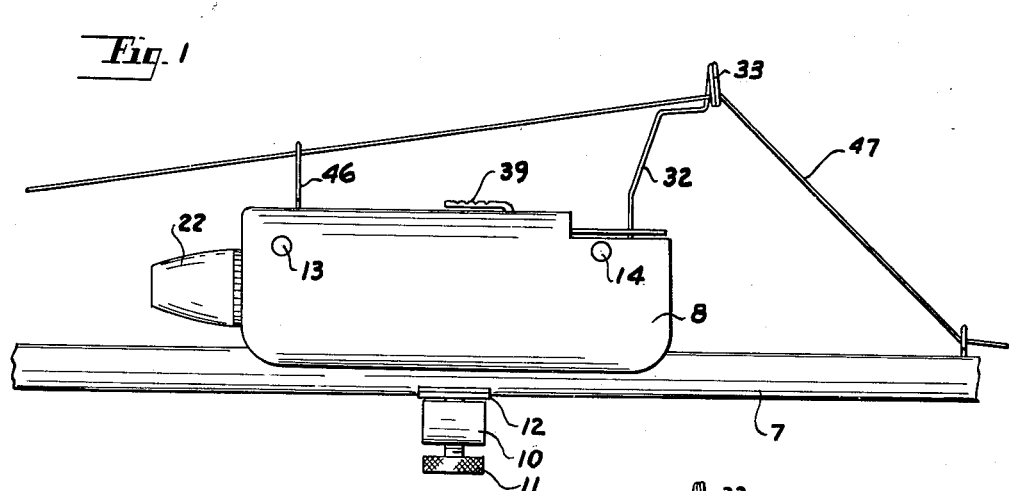
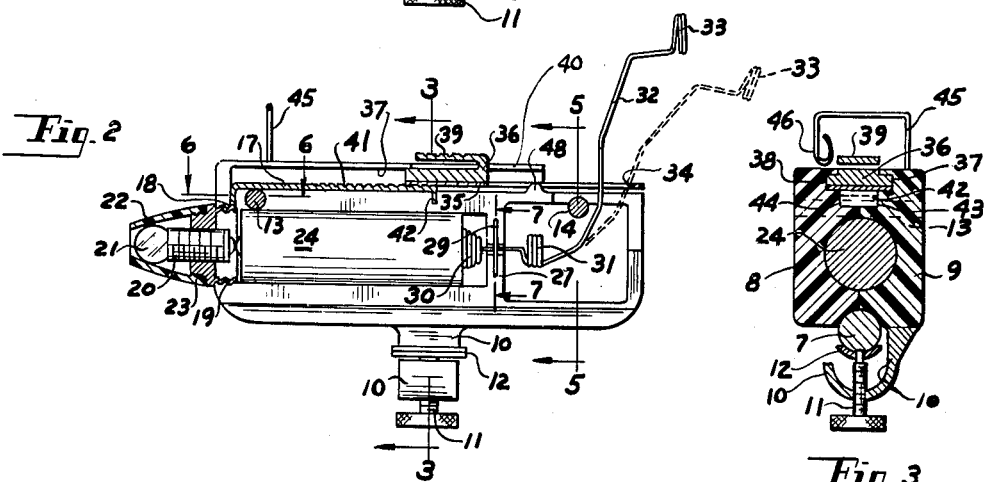
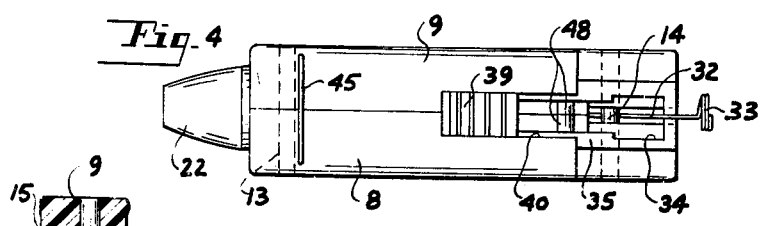
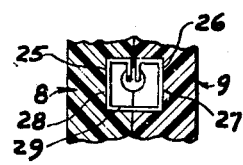
INVENTOR.
LOUIS A. SADER.
JAMES CUCURO.
BY
ATTORNEY Patented Apr. 14, 1953

2,634,538

UNITED STATES PATENT OFFICE 2,634,538

NIBBLE INDICATOR FOR USE ON FISHLINES

Louis A. Sader, Grosse Pointe Park, and
James Cucuro, Detroit, Mich.

Application May 22, 1951, Serial No. 227,626

6 Claims. (Cl. 43—17)

Our invention relates to a new and useful improvement in a nibble indicator for use on fish lines so arranged and constructed that a nibble or strike on the fish line will be visibly indicated to the user of the fish line.

Another object of the invention is the provision of a nibble indicator associated with a fish pole or rod so arranged and constructed that upon a fish striking or nibbling at the bait a circuit to an electric bulb will be closed, so that the user will know from the lighting of the bulb of the maneuvers of the fish around the bait.

Another object of the invention is the provision in a device of this class of a structure whereby an adjustment may be made so that the signaling mechanism will operate only at predetermined pulls or tugs on the line.

Another object of the invention is the provision of a structure so arranged and constructed that the operating mechanism may be turned off at will.

Other objects will appear hereinafter.

It is recognized that various modifications and changes may be made in the detail of structure illustrated without departing from the invention and it is intended that the present disclosure shall be considered but the preferred embodiment.

Forming a part of this application are drawings in which:

Fig. 1 is a side elevational view of the invention showing it applied to a fishing rod, Fig. 2 is a longitudinal sectional view of the invention, Fig. 3 is a sectional view taken on line 3—3 of Fig. 2, Fig. 4 is a top plan view of the invention, Fig. 5 is a sectional view taken on line 5—5 of Fig. 2 with a part broken away, Fig. 6 is a sectional view taken on line 6—6 of Fig. 2, Fig. 7 is a fragmentary sectional view taken on line 7—7 of Fig. 2.

As shown in the drawings, the invention is associated with a fishing rod or pole 7 and in the present disclosure the structure is illustrated as detachably mounted upon the pole or rod which, as the description proceeds, it will be obvious that, if desired, the structure may be built on to the rod or pole as a permanent part thereof. The structure comprises a housing embodying sections 8 and 9, held together by pins 13 and 14. It is also believed obvious that if the structure is formed from plastic the housing may be formed as one unit instead of embodying the sections 8 and 9. It is preferred to form the structure from plastic but it is recognized that other types of material may be used with equal effect.

Extended downwardly from the section 9 is a bracket 10 through which is threaded a screw 11 to force a presser plate 12 against the rod or pole 7, so as to securely clamp the housing on the rod or pole.

Formed on the inner faces of each of the sections 8 and 9 are opposing grooves 15 and 16. Engaging in these grooves is a metal strip 17. This strip 17 is provided with the angularly turned portion 18 at one end for engaging a metallic sleeve 19 into which is threaded the metallic portion 20 of a light bulb 21 and around which is positioned a reflector 22, so that the member 17 is thus in electrical contact with one of the terminals of the light bulb, this terminal engaging the terminal 23 of the dry cell battery 24. Engaging in the grooves 25 and 26 formed in the partitions 27 and 28 is a wire frame 29, extending outwardly from which is a spring portion 30 which engages one end of the battery 24. Carried by this frame is the coil 31 carrying the arm 32 having the eyelet 33 formed therein, which extends forwardly of the housing and projects through the slot or opening 34 in the slidable contact plate 35. Fixedly mounted on this plate 35 is a presser plate 36 riding in grooves 37 and 38 formed in the housing sections and provided with a thumb piece 39, which extends upwardly through the slot 40. The upper surface of the plate 17 is provided with serrations 41, so that some resistance is encountered upon sliding the contact plate 35 over and in engagement with the upper face of the plate 17. An angularly turned portion 42 engages in grooves 43 and 44 formed in the housing sections.

Projecting upwardly from one of the housing sections is a wire 45 connected at one end to one of the sections and bent to form an eyelet and having its free end 46 directed towards the other section. The construction is such that a fish line 47 may be threaded through the eyelet or coil 33 and also through the eyelet formed by the wire 45. When the fishing line is disengaged from the eyelet 33, the invention will be rendered inoperative while in use. When the line is positioned as shown in Fig. 1 the contact plate 35 may be moved to any desired position within the limits of its range of movement and while in contact with the plate 17 should the arm 32 be bent or flexed downwardly until it engages the edge of the opening of slot 34, the circuit to the light bulb will be closed and the light bulb will be lit. This plate 35 may be slid to various positions. If it is slid from the position shown in Fig. 2 to the left, so that there is but a slight distance between the edge of the slot and the arm 32 a very light tug or pull would move the arm 32 into electrical engagement with this plate 35. When in this position of adjustment a very light nibble would immediately be indicated by the light bulb. By sliding the plate 35 to the right, while it still remains in contact with the plate 17, the arm 32 would have to be flexed a greater distance and consequently it would be necessary that the tug or pull on the line be greater. Thus the device may be adjusted for sensitivity and may be so adjusted as to fairly accurately indicate the size of the fish which is nibbling or pulling on the line. If desired the plate 35 may be slid forward until the edge of the presser finger 39 will engage the boss 48 which projects into the slot or opening 34. When this presser finger 39 engages the boss 48 the plate 35 will have moved out of contact with the plate 17 and thus the device may be stored away without any possibility of the light bulb being turned on.

Experience has shown that a device of this class is highly efficient in use. It is believed obvious that when the structure is mounted on a fishing pole or rod it may be easily and quickly removed therefrom and placed thereon, but that it may also be built into the rod as a permanent part of the structure.

By having the adjustable contact the sensitivity required in the mechanism may be maintained even in flowing water or where there is a current. In a flowing stream or in a lake in which there is a current the flowing water will assert a certain pull on the line and by adjusting the plate 35 to the proper position this current pull on the line may be compensated for. As soon as this position of adjustment is reached the mechanism will operate in the manner already described to produce the desired sensitivity of the mechanism in indicating a pull on the line by a fish.

What we claim is:

1. A nibble indicator for use on fish lines, comprising: a housing; a battery mounted in said housing; a light bulb carried by said housing, one terminal of said light bulb being in electrical connection with one end of said battery; a metallic plate slidable on said housing and in electrical connections with the other terminal of said light bulb, said plate having a slot formed therethrough; and a spring arm carried by said housing and in electrical connection at one end with the opposite end of said battery and projected at its opposite end through said slot, said opposite end being normally held out of engagement with the edge of said slot and being swingable into engagement with the end of said slot for closing the circuit to said light bulb.

2. A nibble indicator for use on fish lines comprising: a housing; a light bulb carried by said housing; a battery in said housing, one of the terminals of said light bulb being in electrical connection with one end of said battery; a slidable plate carried by said housing in the opposite end of said battery, said plate, adjacent one end, having a slot formed therein; a spring arm mounted on said housing adjacent one end, said end being in electrical connection with the opposite end of said battery, the opposite end of said spring arm being projected through said slot and normally retained in position of non- engagement with said plate; an eyelet on said opposite end through which a fish line may be threaded, said opposite end of said arm being swingable into engagement with said plate, upon a pull on said line for closing the circuit to said light bulb; and a guide eyelet on said housing through which said fish line may be passed for retaining said line in position for effecting a swinging of said arm into contacting position upon a pull of said line.

3. A nibble indicator adapted for use on a fishing line, comprising: a housing; a light bulb carried by said housing; a battery within said housing and in electrical connection at one end with one of the terminals of the light bulb; a metallic frame; a spring member projecting outwardly from one side of said frame and in electrical connection with the opposite end of said battery; a spring arm projecting outwardly from the opposite end of said frame; an eyelet on the free end of said spring arm through which a fish line may be threaded; a metallic plate slidably mounted on said housing and having a slot formed therein through which said spring arm is projected, said spring arm being normally held out of engagement with the edge of said slot and said plate being slidable for moving the edge of said slot toward and away from said spring arm; and an electrical conductor for connecting said slidable plate in electrical connection to the opposite end of said battery, the flexing of said arm in one direction effecting an engagement of said arm with said plate and closing the circuit to said battery.

4. A nibble indicator for use on fishing lines, comprising: a housing; a battery mounted in said housing; a light bulb carried by said housing and in electrical connection at one of its terminals with one end of said battery; a plate slidably mounted on said housing and having a slot formed therethrough and in electrical connection with the other terminal of said bulb; a spring arm carried by said housing and projecting at one end outwardly of said housing through said slot; and an electrical conductor at the opposite end of said spring arm for electrically connecting said spring arm to the other end of said battery, said spring arm being engageable with the edge of said slot upon the flexing of said spring arm a predetermined distance for closing the circuit to said light bulb, said plate being slidable for moving the engaged end of said slot toward and away from said arm for varying said predetermined distance, said spring arm being normally out of engagement with the edge of said slot.

5. A nibble indicator of the class described adapted for use with a fishing line, comprising: a housing embodying a pair of opposed sections, said sections having in opposed faces a longitudinally directed slot communicating with a transversely directed slot; a light bulb carried by said housing at one end; a battery positioned in said housing and in electrical connection at one end with one of the terminals of the light bulb; a metallic conductor positioned in said longitudinally directed slots and having an angularly turned portion engaging in said transverse slots and engaging the other terminal of said light bulb; a metallic plate slidably mounted on said housing and in engagement with said conductor and having a slot formed adjacent one end; a spring arm mounted in said housing and extending outwardly thereof at one end through said slot; an eyelet at said end of said spring arm for threading of a fish line therethrough; and an electric connection between the opposite end of said battery and the opposite end of said arm, said eyelet bearing end of said arm being flexible upon a pull on said fishing line into engagement with the edge of said slot, said slidable plate being slidable for moving said end toward and away from said spring arm.

6. A nibble indicator of the class described adapted for use with a fishing line, comprising: a housing embodying a pair of opposed sections, said sections having in opposed faces a longitudinally directed slot communicating with a transversely directed slot; a light bulb carried by said housing at one end; a battery positioned in said housing and in electrical connection at one end with one of the terminals of the light bulb; a metallic conductor positioned in said longitudinally directed slots and having an angularly turned portion engaging in said transverse slots and engaging the other terminal of said light bulb; a metallic plate slidably mounted on said housing and in engagement with said conductor and having a slot formed adjacent one end; a spring arm mounted in said housing and extending outwardly thereof at one end through said slot; an eyelet at said end of said spring arm for threading of a fish line therethrough; an electric connection between the opposite end of said battery and the opposite end of said arm, said eyelet bearing end of said arm being flexible upon a pull on said fishing line into engagement with the edge of said slot, said slidable plate being slidable for moving said end toward and away from said spring arm; and an eyelet carried by said housing through which the fishing line may be threaded.

LOUIS A. SADER.
JAMES CUCURO.

References Cited in the file of this patent

UNITED STATES PATENTS

| Number | Name | Date |
|---|---|---|
| 1,337,292 | Timmons | Apr. 20, 1920 |
| 2,196,784 | Simmons et al. | Apr. 9, 1940 |